United States Patent [19]

Murakami

[11] Patent Number: 4,865,075
[45] Date of Patent: Sep. 12, 1989

[54] SEALING DEVICE FOR AIR ROTARY JOINT

[75] Inventor: Kiyoharu Murakami, Neyagawa, Japan

[73] Assignee: Kabushiki Kaisha Daikin Seisakusho, Osaka, Japan

[21] Appl. No.: 195,047

[22] Filed: May 17, 1988

[30] Foreign Application Priority Data

May 20, 1987 [JP] Japan .............................. 62-75830[U]

[51] Int. Cl.⁴ ........................................... F16L 27/00
[52] U.S. Cl. ........................................ 137/580; 277/3; 277/59
[58] Field of Search ....................... 137/580; 277/59, 3

[56] References Cited

U.S. PATENT DOCUMENTS

| | | | |
|---|---|---|---|
| 1,722,135 | 7/1929 | Frey | 277/3 |
| 3,088,744 | 7/1963 | Ezekiel | 277/3 |
| 3,420,434 | 1/1969 | Swearingen | 277/3 |
| 3,923,133 | 12/1975 | Chivari | 137/580 |
| 4,005,580 | 2/1977 | Swearingen | 277/3 |
| 4,010,960 | 3/1977 | Mardin | 277/3 |
| 4,189,156 | 2/1980 | Geary, Jr. et al. | 277/3 |
| 4,252,147 | 2/1981 | Gerber et al. | 137/580 |

FOREIGN PATENT DOCUMENTS 61-306054 12/1961 Japan .

Primary Examiner—A. Michael Chambers
Attorney, Agent, or Firm—Armstrong, Nikaido, Marmelstein, Kubovcik & Murray

[57] ABSTRACT

In an air rotary joint supplying compressed air from an outside source through a rotating shaft to a pneumatic equipment; a sealing device for the air rotary joint, in which lubricating oil chambers partitioned by air seals are formed on both sides of an air inlet port, an inlet piping is connected to one lubricating oil chamber, a check valve for checking a counter flow of lubricating oil is installed in the inlet piping, an outlet piping is connected to the other lubricating oil chamber, and a relief valve for maintaining a hydraulic pressure in the lubricating oil chamber below a specified maximum value is installed in the outlet piping so as to prevent air leakage due to counter flow of compressed air into the lubricating oil chamber.

4 Claims, 2 Drawing Sheets

SEALING DEVICE FOR AIR ROTARY JOINT

BACKGROUND OF THE INVENTION

This invention relates to a sealing device for an air rotary joint which supplies compressed air to pneumatic operated equipment such as an air clutch etc.

A conventional apparatus of the type to which the air rotary joint of the present invention is directed is illustrated by FIG. 2.

In FIG. 2 showing an automobile air clutch which is a kind of pneumatic equipment, 10 is an engine side flywheel. A clutch cover 12 is fastened to the flywheel 10 and a pressing force generated by an annular pneumatic actuator 14 (pneumatic equipment) of the clutch cover 12 is exerted on a pressure plate 16, so that a clutch disc 18 is held between the pressure plate 16 and the flywheel 10.

The clutch disc 18 is spline fitted onto an input shaft 20 of a transmission (not shown) disposed at a rear stage of the air clutch. A cylindrical shaft 24 is fitted onto an outer periphery of the input shaft 20 through a bush 22. The clutch cover 12 fits onto a left end portion in the figure of the cylindrical shaft 24.

A right end portion of the cylindrical shaft 24 is surrounded by a cover 26, and a chamber 28 is formed in an inside of the cover 26. Three air seals 30a through 30c are disposed between the cover 26 and the cylindrical shaft 24 so that air leakage is prevented by the air seals 30a~30c as described later in details.

On the other hand, a control valve 32 operated by a clutch pedal 31 is pneumatically connected to the cover 26, and compressed air flowing from a compressor 34 through a pressure regulating valve 36 to the control valve 32 is controlled thereat to be sent to a passage 42 through a chamber 38 between the air seals 30a and 30b and an inlet port 40 of the cylindrical shaft 24. Further, a left end portion of the passage 42 opens to an outlet port 44, and the outlet port 44 is connected through a passage 46 formed in a thickness of the cover 12 to an air chamber 48 of the pneumatic actuator 14.

In this structure, however; a peripheral speed of a lip increases at a time of high speed rotation and a pressing force of the lip increases due to an increasing tendency of pneumatic pressure, so that a PV-valve (P: pressure and V: peripheral speed) increases to finally induce a danger of a breakage of the air seal due to frictional heat.

In this connection, the applicant of the present invention has previously attempted to improve the prior art air rotary joint shown by FIG. 2 by forming a lubricating oil chamber at an outside of the air chamber 35 by combining plural air seals. However, this prior attempt provides an imperfect solution in that air leaks from the air chamber 38 to the lubricating oil when the engine is stopped.

SUMMARY OF THE INVENTION

An object of the invention is to provide a sealing device for an air rotary joint which can prevent compressed air from leaking from an air chamber when an engine is stopped, while avoiding breakage of the air seal due to frictional heat.

In an air rotary joint which supplies compressed air from an outside through a rotating shaft to a pneumatic equipment; this invention relates to a sealing device for the air rotary joint, in which a pair of rubber-made inside air seals facing on an air chamber supplying compressed air to an inside of the rotating shaft is provided in combination with a pair of outside air seals spaced from the inside air seals in their axial direction, lubricating oil chambers composed of spaces filled with lubricating oil between the both air seals are formed, a passage connecting the both lubricating oil chambers is provided, an inlet piping having a check valve checking a counter flow of pressure oil from the lubricating oil chambers and supplying the pressure oil is connected to one of said lubricating oil chambers, and an outlet piping having a relief valve maintaining a hydraulic pressure in an oil chamber inside below a specified maximum value is provided for the other lubricating oil chamber.

The pressure oil is kept in the lubricating oil chamber by the check valve and the relief valve after the engine is stopped to prevent the compressed air from leaking into the lubricating oil chamber from the air chamber.

DESCRIPTION OF THE PREFERRED EMBODIMENT

Figure 1:
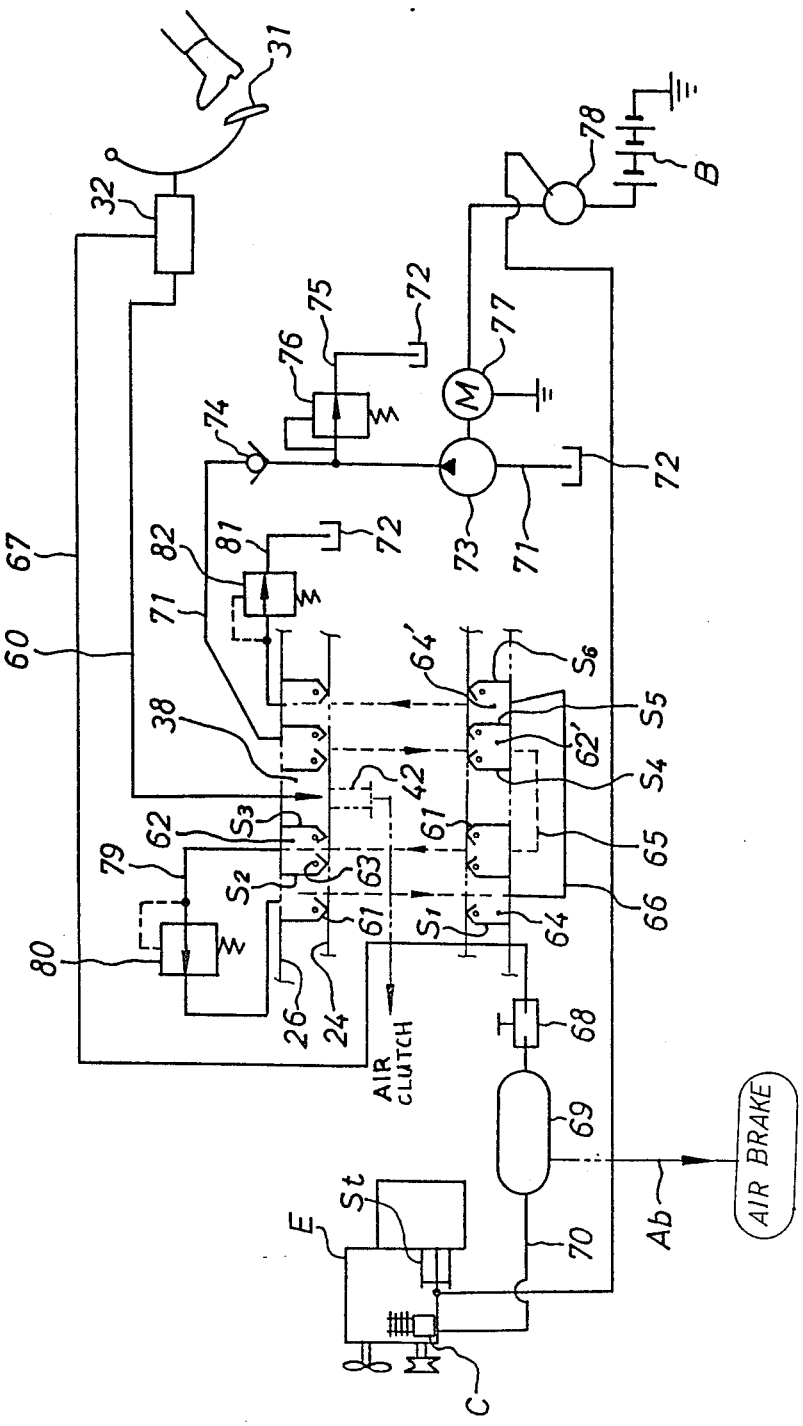
FIG. 1 is a schematic structural view showing the first embodiment of the invention.

The air seal for automobile air clutch according to the present invention will be described hereunder with reference to FIG. 1. FIG. 1 is an enlarged view of I-part of FIG. 2. The other parts of FIG. 1 are approximately similar to those of FIG. 2 so that the same symbols are used in FIG. 2.

In FIG. 1, six rubber-made air seals (three on both left and right sides of a chamber 38) are disposed on an outer peripheral surface of a cylindrical surface of a cylindrical shaft 24 (rotating shaft) with spaces left therebetween in their axial direction. A compressed air passage 60 is connected to said chamber 38, and compressed air flowing from the compressed air passage 60 into the chamber 38 is supplied from a passage 42 (FIG. 2) of the cylindrical shaft 24 to an air clutch.

A rubber-made annular air seal S1 (auxiliary air seal) is disposed in such a position that a lip 61 opens toward the chamber 38, and an air seal S2 (outside air seal) is disposed in the same manner. The lip 61 is made of a rubber which is continuous over the entire circumference, and an inner peripheral edge of the lip 61 contacts with the cylindrical shaft 24. On the other hand, an air seal S3 (inside air seal) is disposed in such a position that the lip 61 opens toward a direction opposite to the chamber 38 (left side of the figure). A lubricating oil chamber 62 is formed between the air seal S3 and the air seal S2. Further, an oil chamber 64 is also formed between the air seal S1 and the air seal S2. Incidentally, 63 is a wire for tightening the lip 61.

Air seals S4 through S6 are disposed at a right side in the figure of the chamber 38 symmetrically with respect to the air seals S1 through S3, and oil chambers 62' and 64' are formed in the same manner. These oil chambers 62 through 64' are interconnected each other through passages 65 and 66. The air seal S4 is the inside air seal, the air seal S5 is the outside air seal and the air seal S6 is the auxiliary air seal. Further, the oil chambers 64 and 64' are auxiliary oil chambers.

Said compressed air passage 60 is connected through a control valve 32 to a clutch pedal 31, a piping 67 is connected to the control valve 32, and a pressure regulating valve 68 and an air tank 69 are provided at the other end of the piping 67. A piping 70 is connected to the air tank 69, and compressed air supplied from a compresser C of an engine E is accumulated in the air tank 69 so that the compressed air in the air tank 69 is adapted to actuate said air clutch or actuate an air brake through a passage Ab.

One end of an inlet piping 71 is connected to said oil chamber 62' and the other end of the inlet piping 71 is connected to an oil tank 72. A hydraulic pump 73 and a check valve 74 are installed in a midway of the inlet piping 71, and the check valve 74 prevents the pressure oil from flowing in an opposite direction. A piping 75 is connected to and branched from the inlet piping 71 between the hydraulic pump 73 and the check valve 74, and a relief valve 76 for maintaining a pressure in the piping 71 below a specified maximum value is installed in the piping 75.

The hydraulic pump 73 is so constructed as to be driven by an electric motor 77, and the motor 77 is wired to a starter switch 78. The starter switch 78 is wired to a battery B and a starter St.

One end of an outlet piping 79 is connected to said oil chamber 62 and the other end of the outlet piping 79 is connected to the oil chamber 64. A relief valve 80 is installed in a midway of the outlet piping 79, and the relief valve 80 is adapted to restrict the maximum pressure of the oil chambers 62 and 62'. In case when a compressed air pressure in the compressed air passage 60 is 4 kg/cm$^2$, a setting relief pressure of the relief valve 80 is set to 4.5 kg/cm$^2 \pm 0.5$ kg/cm$^2$ for example.

Further, a piping 81 is connected to said oil chamber 64' and a relief valve 82 is installed in a midway of the piping 81. The relief valve 82 has a function to restrict the maximum pressure of the oil chambers 64 and 64', and its setting relief pressure is set to 0.1 kg/cm$^2 \sim 0.3$ kg/cm$^2$.

Figure 2:
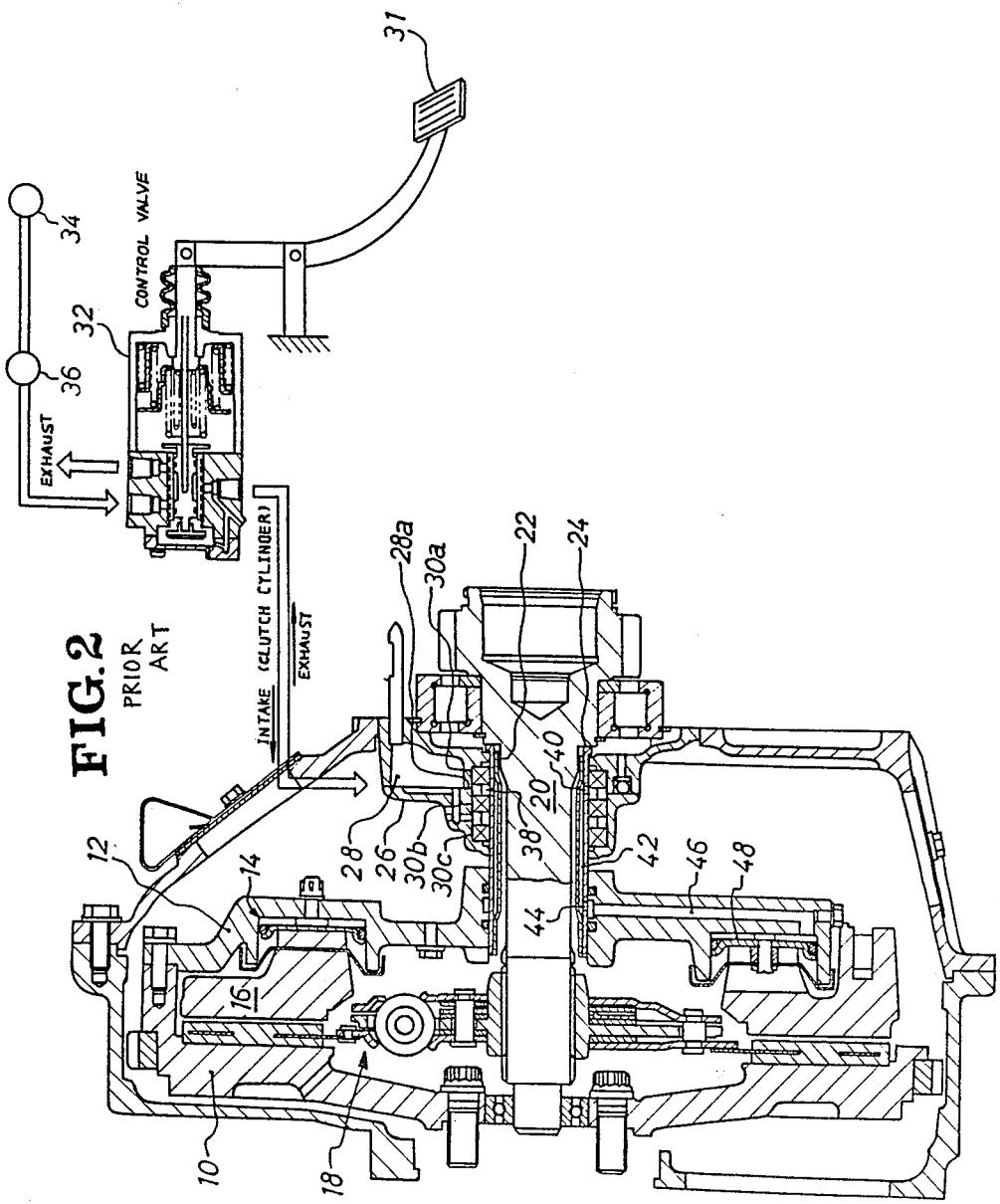
FIG. 2 is a vertical sectional view showing a conventional embodiment.

A cover 26 similar to that of FIG. 2 is provided at a radial outside of said air seals S1~S6. These air seals S1-S6 are formed into continously annular shape throughout in its circumferential direction.

Function will be described hereunder. In the sealing device of FIG. 1, the starter switch 78 is closed to energize the motor 77 during operation of the engine E. Since the hydraulic pump 73 is driven by the motor 77 to send pressurized lubricating oil regulated by the relief valve 80 to below 4.5 kg/cm$^2 \pm 0.5$ kg/cm$^2$ to the oil chambers 62 and 62', oil films are formed on tip end portions of the lips 61 so that the oil films prevent the compressed air in the chamber 38 from leaking and at the same time the lips reduce the friction force.

The oil chambers 64 and 64' pressure regulated by the relief valve 82 to 0.1 kg/cm$^2 \sim 0.3$ kg/cm$^2$, which is lower than the pressure of the oil chambers 62 and 62', are provided at an outside of the chambers 62 and 62' so that a double sealing structure can be accomplished to provide a more sure countermeasure against the air leakage.

When the engine is to be stopped, the starter switch 78 is opened to stop the motor 77 so that the supply of lubricating oil to the oil chambers 62 and 62' by the hydraulic pump 73 is also stopped, but the oil chambers 62 and 62' are shut tight by the relief valve 80 and the check valve 74. On the other hand, the compressed air accumulated in the air tank 69 is supplied to the chamber 38 even when the engine E is stopping, and this compressed air in the chamber 38 would flow in the reverse direction from the lips 61 of the air seals S3 and S4 into the oil chambers 62 and 62' to cause the air leakage. However, the lubricating oil in the oil chambers 62 and 62' is shut tight by the relief valve 80 and the check valve 74 as mentioned above, so that the compressed air does not flow in the reverse direction to prevent the compressed air in the air tank 69 from leaking when the engine E is stopping.

Since the compressed air in the air tank 69 is supplied not only to the air clutch but to the air brake, a braking effect of the air brake will become worse if the compressed air in the air tank 69 becomes short. However, in the sealing device of FIG. 1, the air leakage does not occur and the compressed air in the air tank 69 will not be exhausted exccessively.

In the sealing device for air rotary joint according to the invention, as described above, a pair of rubber-made inside air seals S3 and S4 facing on the air chamber 38 supplying compressed air to the inside of the cylindrical shaft 24 is provided in combination with a pair of the outside air seals S2 and S5 spaced from the inside air seals S3 and S4 in their axial direction, the lubricating oil chambers 62 and 62' composed of spaces filled with lubricating oil between the both air seals are formed, the passage 65 connecting the both lubricating oil chambers 62 and 62' is provided, the inlet piping 71 having the check valve 74 checking the counter flow of pressure oil from the lubricating oil chambers 62 and 62' and supplying the pressure oil is connected to said lubricating oil chamber 62', and the outlet piping 79 having the relief valve 80 maintaining the hydraulic pressure in the oil chamber inside below the specified maximum value is provided for the other lubricating oil chamber 62. In the conventional structure, the compressed air in the chamber 38 would flow in the reverse direction from the lips 61 of the air seals S3 and S4 into the oil chambers 62 and 62' to cause the air leakage. In the structure according to the present invention, however, the lubricating oil in the oil chamber 62 and 62' can be shut tight therein by the relief valve 80 and the check valve 74, so that the compressed air does not flow in the reverse direction into the oil chambers 62 and 62' and the counter flow of compressed air in the air tank 69 can be avoided when the engine E is stopping.

The sealing device according to the present invention is applicable not only to the automobile air clutch as shown in FIG. 1 and FIG. 2, but also to pneumatic equipment in general.

Further, a bush may be used in place of the air seal S6.

What is claimed is:

1. A sealing device for an air rotary joint which supplies compressed air from a source through an inlet port in a rotating shaft comprising:

a cover surrounding said rotating shaft and defining an air chamber with said shaft;

means supplying compressed air to said air chamber;

a spaced pair of annular, rubber inside air seals contacting said rotating shaft and defining a fluid passage from said air chamber to said inlet port;

a pair of annular outside air seals axially spaced from said inside air seals and partially defining a pair of lubricating oil chambers with each lubricating oil chamber located between respective ones of said inside and outside air seals, a fluid passage connecting said pair of lubricating oil chambers, a pair of annular auxiliary air seals axially spaced from said outside air seals and partially defining a pair of auxiliary lubricating oil chambers with each auxiliary lubricating oil chamber located between respective ones of said outside air seals and said auxiliary air seals, a fluid passage connecting said pair of auxiliary lubricating oil chambers, means providing a source of pressurized lubricating oil, an inlet pipe having a check valve permitting flow of pressurized lubricating oil from said source to one of said lubricating oil chambers and preventing back flow of lubricating oil in said inlet pipe, an outlet pipe providing fluid passage between the other lubricating oil chamber and one of said auxiliary lubricating oil chambers, a return pipe providing fluid passage between the other auxiliary lubricating oil chamber and a tank, a pre-set relief valve in said outlet pipe maintaining the hydraulic pressure of lubricating oil in said pair of lubricating oil chambers between said check valve and said relief valve below a specified maximum pressure, and a second relief valve in said return pipe and pre-set to maintain the pressure of lubricating oil in said pair of auxiliary lubricating chambers at a pressure less than said hydraulic pressure of lubricating oil in said pair of lubricating oil chambers.

2. A sealing device for an air rotary joint as set forth in claim 1, wherein the relief pressure of the relief valve in said outlet pipe is set to maintain the pressure of the lubricating oil in said pair of lubricating oil chambers below the pressure of the air chamber.

3. A sealing device for an air rotary joint as set forth in claim 1, wherein said source of pressurized lubricating oil is a hydraulic pump driven by an electric motor interlocked to an automobile starter and further including a relief valve connected to and regulating lubricating oil pressure in the inlet pipe.

4. A sealing device for an air rotary joint as set forth in claim 1, wherein said means supplying compressed air to said air chamber includes a pressure regulating valve connected to said air chamber and operated by an automobile clutch pedal and said pressure regulating valve is adapted to supply compressed air to an air brake.

* * * * *